June 25, 1957 A. M. CLOGSTON 2,797,392
ELECTRICAL CONDUCTOR COMPRISING MULTIPLICITY
OF INSULATED FILAMENTS
Original Filed March 7, 1951 2 Sheets-Sheet 1
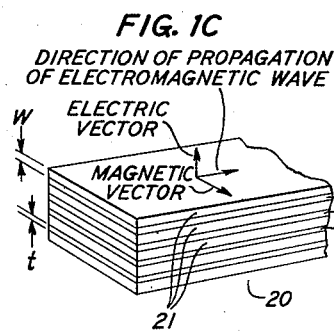
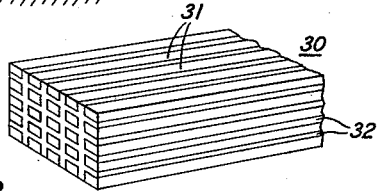
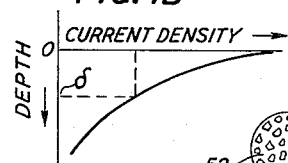
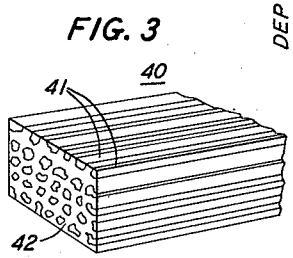
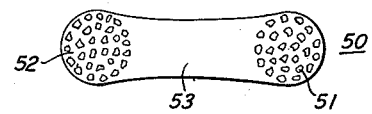
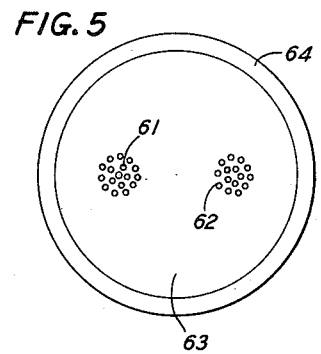
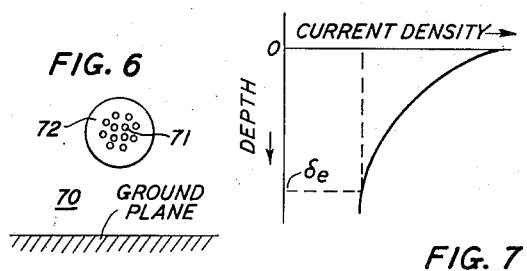
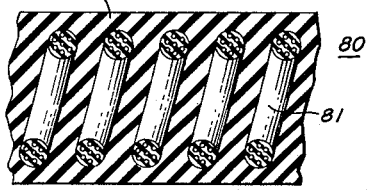
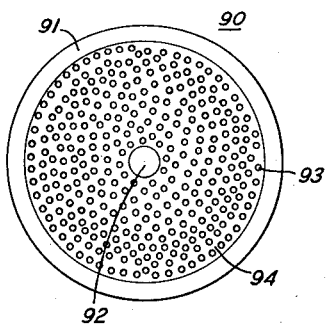
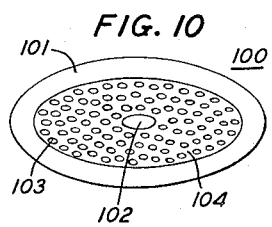
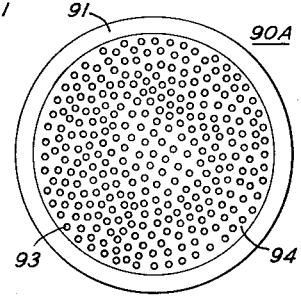
INVENTOR
A. M. CLOGSTON
BY
Hugh S. Werty
ATTORNEY June 25, 1957 A. M. CLOGSTON 2,797,392
ELECTRICAL CONDUCTOR COMPRISING MULTIPLICITY
OF INSULATED FILAMENTS
Original Filed March 7, 1951 2 Sheets-Sheet 2
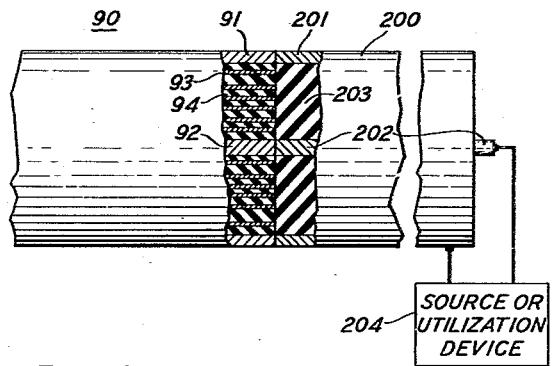
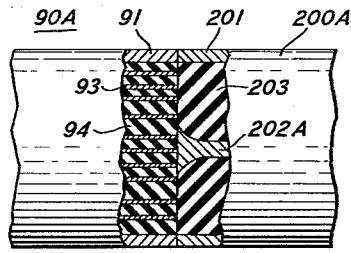
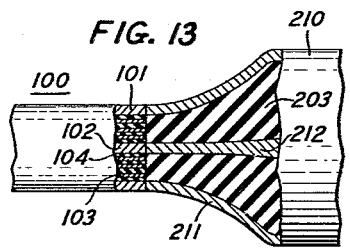
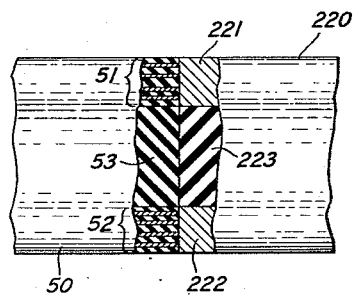
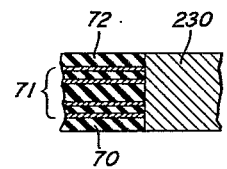
INVENTOR
A. M. CLOGSTON
BY
Hugh S. Wertz
ATTORNEY United States Patent Office 2,797,392
Patented June 25, 1957

2,797,392

ELECTRICAL CONDUCTOR COMPRISING MULTIPLICITY OF INSULATED FILAMENTS

Albert M. Clogston, Morris Plains, N. J., assignor to Bell Telephone Laboratories, Incorporated, New York, N. Y., a corporation of New York Original application March 7, 1951, Serial No. 214,393, now Patent No. 2,769,148, dated October 30, 1956. Divided and this application April 21, 1952, Serial No. 283,272

20 Claims. (Cl. 333—84)

This invention relates to electrical conductors and more specifically to composite conductors formed of a multiplicity of filamentary conducting members separated by insulating material.

This application is a division of application Serial No. 214,393, filed March 7, 1951, which issued as U. S. Patent No. 2,769,148 on October 30, 1956.

It is an object of this invention to improve the current distribution in conductors of the above-mentioned type.

Due to the phenomenon known as "skin effect," at high frequencies the current distribution through a conductor is not uniform. Consider for example the case of a two-conductor coaxial line to which are applied waves of increasing frequency. At zero and sufficiently low frequencies the currents in the conductors are substantially uniformly distributed throughout and the resistance of the conductors, and hence the conductor loss in the line, is at a minimum. With increasing frequency the current distribution changes so that the current density is a maximum at the inner surface of the outer conductor and at the outer surface of the inner conductor and decreases into the material at a rate depending on the frequency and the material. In the example given, the current density may be negligible at the other surface of each conductor. From another point of view, the electromagnetic field between the two conductors (where the useful power is transmitted) penetrates into the conductors with a field intensity decreasing with distance. Thus the current density (or field) in each conductor is associated with a power loss that is a function of the distribution of current density (or field) across the thickness of the conductor.

In the copending parent application identified above, there are disclosed a number of composite conductors, each of which comprises a multiplicity of insulated conducting elements of such number, dimensions, and disposition relative to each other and to the orientation of the electromagnetic wave being propagated therein as to achieve a more favorable distribution of current and field within the conducting material. In these composite conductors the power loss associated with skin effect in electrical conductors is greatly reduced.

Applying the principles of the invention of the parent application to the case of the two-conductor coaxial line, one or both of the conductors is formed of a multiplicity of thin metal laminations insulated from one another by layers of insulating material, the smallest dimensions of the laminations being in the directions perpendicular to both the direction of wave propagation of the magnetic vector. Each metal lamination is many times (for example 10, 100 or even 1000) smaller than the factor $\delta$ which is called one skin thickness or one skin depth. The distance $\delta$ is given by the expression $$\delta = \sqrt{\frac{1}{\pi f \mu \sigma}} \qquad (1)$$

where $\delta$ is expressed in meters, $f$ is the frequency in cycles per second, $\mu$ is the permeability of the metal in henries per meter and $\sigma$ is the conductivity in mhos per meter.

The factor $\sigma$ measures the distance in which the current and field penetrating into a slab of the metal many times $\sigma$ in thickness will decrease by one neper; i. e., their amplitude will become equal to $$\frac{1}{e} = 0.3679 \ldots$$

times their amplitude at the surface of the slab.

It is pointed out in the parent application that when a conductor has such a laminated structure, a wave propagated along the conductor at a velocity in the neighborhood of a certain critical value will penetrate further into the conductor (or completely through it) than it would penetrate into a solid conductor of the same material, resulting in a more uniform current distribution in the laminated conductor and consequently lower losses. The critical velocity for the type of structure just described is determined by the thickness of the metal and insulating laminae and the dielectric constant of the insulating laminae in the composite conductors. The critical velocity can be maintained by making the dielectric constant of the main dielectric, that is, the dielectric material intermediate the two coaxial conductors one or both of which may be composite conductors, equal to $$\epsilon_1 = \epsilon_2 \left(1 + \frac{W}{t}\right) \qquad (2)$$

where $\epsilon_1$ is the dielectric constant of the main dielectric element between the two conductors in farads per meter, $\epsilon_2$ is the dielectric constant of the insulating material between the laminae of the conductors in farads per meter, $W$ is the thickness of one of the metal laminae, in meters, and $t$ is the thickness of an insulating layer in meters.

In the parent application, the principles used in the construction of laminated structures are applied to composite conductors and cables utilizing the filamentary conductors. In the case of filaments, two dimensions are usually made small compared to the factor $\delta$. In certain circumstances, the filaments need not be continuous, as breaks therein will not cause the conductor to be inoperative at high frequencies. The invention is applicable to coaxial cables, wave guides, antennae, resonators, cable pairs, and single composite conductors of any cross section and for any of a great variety of uses—to mention just a few types of conductors wherein the present invention can be applied.

The invention will be more readily understood by referring to the following description taken in connection with the accompanying drawings forming a part thereof, in which:

Fig. 1A is a schematic representation of an electromagnetic wave propagating through space in the neighborhood of an electrical conductor;

Fig. 1B is a graph of current density vs. depth (distance away from the surface) in the conductor of Fig. 1A;

Fig. 1C is a schematic diagram showing respectively the directions of electric and magnetic field vectors and the direction of propagation of an electromagnetic wave near the surface of a rectangular stack or conductor;

Fig. 2A is a graph having the same coordinates as in Fig. 1B, and showing the increased skin depth produced by the conductor of Fig. 2 as compared with that of Fig. 1A;

Fig. 2B is a perspective view of a modification of the stack shown in Fig. 1C in accordance with the invention, the sheets being replaced by rows of rectangular rods, all the rods being separated from adjacent ones by insulating material;

Fig. 3 is a perspective view of a modification of the arrangement shown in Fig. 2, the rods being of irregular size, shape and disposition;

Fig. 4 is an end view of a two-conductor line in accordance with the invention, each of the conductors comprising a multiplicity of tiny filaments separated by insulating material and the two conductors being separated by a dielectric;

Fig. 5 is an end view of a modification of the arrangement shown in Fig. 4, the two filamented conductors being spaced apart in a dielectric which is enclosed within a metal sheath;

Fig. 6 is an end view of another embodiment of the invention involving a single filamented conductor with a ground return;

Fig. 7 is a cross-sectional longitudinal view of a coil made with a composite conductor in accordance with the invention embedded in dielectric material;

Fig. 8 is an end view of another transmission line in accordance with the invention, in which the space between a central core and an outer sheath is filled with a multiplicity of filaments insulated from one another;

Fig. 9 is an end view of a composite conductor like that shown in Fig. 8 but without the central core;

Fig. 10 is an end view of a composite conductor like that of Fig. 8 but in which the cross section is non-circular;

Fig. 11 illustrates a way of terminating the cable shown in Fig. 8;

Fig. 12 illustrates a way of terminating the cable shown in Fig. 9;

Fig. 13 illustrates a way of terminating the coaxial cable shown in Fig. 10;

Fig. 14 shows a way of terminating the pair of conductors shown in Fig. 4; and

Fig. 15 represents a way of terminating the conductor shown in Fig. 14.

Referring more particularly to the drawings, consider an electromagnetic wave propagating through space in the neighborhood of, and parallel to the surface of an electrical conductor such as copper, silver or aluminum, for example. This situation is shown diagrammatically in connection with the conductor 10 in Fig. 1A which can be representative of many phenomena. It can illustrate, for instance, the transmission of an electromagnetic wave through a coaxial line, or along an open or shielded two-wire system, or a wave propagating through a metal wave guide. It can also represent the situation in the vicinity of a transmitting or receiving antenna. Clearly a very broad class of electrical phenomena involving the transfer or periodic oscillation of electromagnetic energy in the vicinity of electrical conductors is represented in Fig. 1A.

The wave propagating in Fig. 1A is necessarily accompanied by electric currents flowing in the metal. Because of these currents, power is removed from the electromagnetic field and dissipated in the metal. This effect is nearly always undesirable. The distribution of this current in a direction away from the surface is shown in Fig. 1B where it has been assumed that the conductor is thick compared to $\delta$ if the frequency is sufficiently high. Because of the well-known "skin effect," most of the current flows in a thin layer near the surface. The distance from the surface at which the current density has fallen to $1/\epsilon = 0.3679\ldots$ times its value at the surface is known (as mentioned above) as the "skin depth" and is denoted by $\delta$. The distance is expressed in terms of the frequency $(f)$ under consideration and the permeability $(\mu)$ and the conductivity $(\sigma)$ of the metal in Equation 1 above. With a given amplitude of the electromagnetic wave, the amount of power lost to the metal will be proportional to $1/\delta\sigma$. Referring to Equation 1, it can be seen that the power loss is proportional to $1/\sqrt{\sigma}$ so that normally the power loss is minimized by choosing a metal of high conductivity, such as copper or silver.

Suppose that it were possible to arbitrarily increase $\delta$ without greatly changing $\sigma$. It is clear that in such a situation the power loss from the electromagnetic wave would be greatly decreased. It has been discovered that it is possible to do just this thing, and the invention of the parent application and of the present one also is based on this discovery. A simple embodiment of the invention will be considered first and then more general cases will be discussed. Referring to Fig. 1C, there is again shown an electromagnetic wave propagating near the surface of an electrical conductor 20. The relationship of the electric and magnetic vectors and of the direction of propagation of the electromagnetic wave are shown. The conductor in Fig. 1C is no longer a solid piece of metal but is composed of many spaced laminae 21 of metal of thickness W arranged parallel to the direction of propagation and parallel to the magnetic vector as shown. These laminae are very thin compared to $\delta$ and are separated by empty space or any appropriate dielectric 22 such as air, polyethylene, polystyrene, quartz, or polyfoam, for example, the thickness thereof being represented by $t$. Whatever the dielectric is, suppose that its dielectric constant is $\epsilon_2$ and suppose that the conductivity of the metal is $\sigma$, as before. Fig. 1C is representative of many situations. The particular case being considered in which the magnetic vector is parallel to the surface of the composite conductor are not representative of all cases, as will be indicated below.

Since the stack of metal laminae in Fig. 1C will not conduct direct current in a direction perpendicular to the plane of the laminae, it is possible by conventional means to measure an average dielectric constant associated with this direction. This average dielectric constant will be denoted by $\bar{\epsilon}$ and is given by the expression $$\bar{\epsilon} = \epsilon_2(1 + W/t) \text{ farads per meter} \tag{3}$$

An electromagnetic wave propagates in a material of dielectric constant $\epsilon$ and permeability $\mu_0$ with a velocity $1/\sqrt{\epsilon\mu_0}$. Let it now be assumed that it has been arranged that the electromagnetic wave in Fig. 1C is traveling with the velocity an electromagnetic wave will have in a medium of dielectric constant $\bar{\epsilon}$ and permeability $\mu_0$. This condition can be arranged by properly disposing suitable dielectric material in all or part of the region traversed by the wave outside the stack. The condition can also be fulfilled by properly shaping adjacent electrical conductors, and a particularly advantageous way of bringing about this condition is described in connection with Fig. 5 of the parent application.

Under the conditions mentioned, if W is small compared to $\delta$, one can define an effective skin depth $\delta_e$ by $$\delta_e = (W+t)\sqrt{3}\left(\frac{\delta}{W}\right)^2 \text{ meters} \tag{4}$$

If the stack of laminations is several times $\delta_e$ in thickness, the current density will decrease exponentially into the stack and be reduced by one neper at a distance below the surface equal to $\delta_e$. This "increased" or "effective" skin depth is shown in Fig. 2A. Furthermore, the effective conductivity $\sigma_e$ of the stack of laminations in the direction of propagation of the wave is given by $$\sigma_e = \sigma\frac{1}{1+t/W} \tag{5}$$

We can now form the term $$\frac{1}{\delta_e \sigma_e}$$

and find that it is given by $$\frac{1}{\delta_e \sigma_e} = \frac{1}{\sigma\delta}\frac{1}{\sqrt{3}}\left(\frac{W}{\delta}\right) \tag{6}$$

It is immediately observed that the power lost from the electromagnetic wave has been reduced by a factor $$\frac{1}{\sqrt{3}}\left(\frac{W}{\delta}\right)$$

For instance, if the laminae in a typical case are $\frac{1}{10}$ skin depth thick, the power taken from the wave will be only $\frac{1}{17}$ of the power that would be lost to a solid conductor.

The increased skin depth described above not only is effective in greatly reducing conductor losses, but has a further major concomitant advantage. Referring to Equation 1 it can be seen that conductor losses generally increase as the square root of the frequency. This variation with frequency very often is equally as troublesome as the losses themselves. A simple but extremely wasteful way to reduce this effect is to make the metal conductor very thin. Suppose for instance that the skin depth is $\delta$ at the highest frequency under consideration. If the conductor is no thicker than $\delta$ the losses will clearly remain uniform, but high, from very low frequencies up to this maximum. Similarly, with the arrangement of Fig. 1C the size of the stack can be limited to the thickness $\delta_e$ determined by Equation 4 at the highest frequency, and thereby obtain uniform loss. But since $\delta_e$ may be made as large as desired by making W small enough, this uniform loss can be achieved without accepting greatly increased losses at the lower frequencies.

The general situation indicated in Fig. 1C can have many specific embodiments and variations of which a number (including various structures using coaxial stacks) are described in the parent application. The present application is concerned with the application of the principles of this and of the parent application to structures of the filamentary type of which a few representating examples will be now described.

In Fig. 2B there is shown in perspective a laminated conductor 30 similar to that in Fig. 1C except that instead of being made up of alternately disposed metal layers 21 and insulating layers 22 it comprises an arrangement in which each metal lamination is divided into a series of rectangular rods 31 spaced by insulation 32. It is clear that this arrangement is similarly as effective as that of Fig. 1C. It its now also clear that the rods 31 of Fig. 2B need not be regularly arranged and indeed not be even rectangular in section. The conductor could in fact be composed as shown in the conductor 40 of Fig. 3 of an irregularly arranged group of conductors 41 of irregular cross section spaced from one another by some suitable solid dielectric 42 or air or vacuum. In fact, all that is required in order that the conductor 40 in Fig. 3 be as effective as the laminations 21 in Fig. 1C for reducing conductor losses is that each of the individual conductors in Fig. 3 have a maximum dimension in the direction of the electric vector small compared to $\delta$. Under those circumstances a bundle of conductors as in Fig. 3 can replace the laminations of a number of the examples given in the parent application.

Suppose now the further step is taken of requiring the conductors 41 in Fig. 3 to have the largest dimension in any direction perpendicular to their length small compared to $\delta$. It is now no longer required that the magnetic vector be parallel to the surface of the composite conductor. Under these circumstances several more specific embodiments of the invention can be considered.

For example, in Fig. 4 there is shown a two-conductor transmission line 50 of a type in common use with each of the conductors 51 and 52 constructed as shown in Fig. 3. Substantial improvement in performance over the conventional two-wire system can be expected. Suitable dielectric 53 is shown joining the two composite conductors 51 and 52 so that the electromagnetic wave will propagate along the system with a velocity appropriate to the average transverse dielectric constant of the bundles.

Figs. 5 and 6 show two more types of transmission lines 60 and 70 obviously related to that shown in Fig. 4. In Fig. 5 two bundles 61 and 62 of very fine filaments are buried in a dielectric material 63 which is enclosed by a sheath 64. The dielectric 63 is chosen as in the arrangement of Fig. 4 so that the electromagnetic wave will propagate along the system with the appropriate velocity. Each group of bundles 61 or 62 may have the same dielectric 63 between the elementary filaments or it may utilize a different dielectric.

In all the examples of the invention so far considered, special means have been provided to assure that the velocity of propagation of the electromagnetic wave along the system is appropriate to the average transverse dielectric constant of the composite conductors. It has been pointed out that under these conditions the currents penetrate deeply within the composite conductor. It is of course then also true that the electromagnetic wave itself penetrates equally deeply into the conductor. Within the conductor the wave has, as might be expected, an intrinsic velocity of propagation just appropriate to the average transverse dielectric constant. Thus, if the region within which the electromagnetic wave propagates is completely filled with the composite conductor, the condition on the velocities is automatically fulfilled. The parent application shows a coaxial transmission line constructed in accordance with this principle. The entire region between the sheath and the core (which may be either of solid tubular metal, either magnetic or non-magnetic, or of dielectric material), is filled with alternate laminae of thin metal and dielectric cylinders. The metal laminae are made as thin as possible compared with the skin depth $\delta$ and the dielectric laminations are also made very thin compared to $\delta$ and in many cases it is preferable to make them smaller than the metal laminations. The material of which the dielectric laminations are made is not critical but is best chosen to have high insulating power and low dielectric constant. In the outer layers, current flows in one direction, and in the inner layers it flows in the opposite direction. The attenuation of such a transmission line is much less than the attenuation of a conventional line of equal outside dimensions.

Fig. 8 shows a cable arrangement 90 in accordance with the present invention comprising an outer metal sheath 91, an inner metal core 92 and a space therebetween filled with a multiplicity of insulated filaments 93 each having a cross section which is small compared with the factor $\delta$ (as in the laminated structure described above). The dielectric constant of the insulating material 94 between the filaments is not critical and again is best chosen to have high insulating power and low dielectric constant. The filaments 93 maintain the same relative cross-sectional or radial position along the cable; that is, there is no necessity to transpose them in order to produce the current and field distribution desired.

Fig. 9 shows a modified structure 90A which is similar in all respects to the cable 90 except that the inner core 92 is absent. Another modification 100 of the structure 90 of Fig. 8 is shown in Fig. 10 wherein, instead of a circular cross section, the cable has an elliptical or other convenient shape, the sheath 101 and the metal inner core 102 (which may be absent) being of elliptical or other convenient configuration. The filaments 103 may be of circular or any other desired configuration, the main requirement being that each of the dimensions in cross section be much smaller than a skin depth $\delta$. The dielectric 104 is chosen with the same care as in the other embodiments heretofore described.

Figs. 11 to 15, inclusive, show various forms of terminations used with the conductor structures shown above. In each case there is the problem of connecting one end of a composite conductor to another conductor in such a way that there is the least possible impedance discontinuity or mismatch at the joint, although generally this condition is not a critical one. In certain situations, however, for example, there may be required a comparatively low-loss cable of great length and, with many intervening joints, it obviously would be advantageous to minimize mismatch and accompanying mode conversion at the joints.

In the arrangement of Fig. 11, a cable such as the cable 90 of Fig. 8 has its end positioned against an end of a cable 200 of the coaxial type having an outer conductor 201 and an inner conductor 202, the space between the conductors for a short interval being filled with dielectric material 203. The dielectric constant of the member 203 is made equal to the average dielectric constant of the composite conductor formed by the members 93 and the insulation therebetween. The outside diameter of the cable 200 is chosen to be the same as the cable 90 so that the sheath 201 butts against and is connected to the sheath 91, and the inner conductor 202 butts against and is connected to the core 92 of the cable 90 (assuming the core is of metal). By means of this connection a mismatch between the cable 200 and the cable 90 is prevented or kept at a minimum. The cable 200 can be connected at its other end to a source of energy or other utilization device 204.

Fig. 12 shows how the conductor 90A in Fig. 9 can be terminated, use being made of a conductor cable 200A which has either a large inner core or one with a flared end, this inner core 202A contacting a few of the filaments 93 located in the central portion of the cable 90A. In this arrangement also, the material of the dielectric member 203 is made equal to the average dielectric constant of the composite conductor formed by the members 93 and the insulation therebetween.

Fig. 13 shows a terminating arrangement for the cable 100 with an elliptical cross section which is shown in Fig. 10. The connector cable 210 has, except for its left-hand portion, a circular cross section but its outer sheath 211 changes gradually from this cross section to an elliptical one at the end surface where it contacts the sheath 101 of the cable 100. The inner core 212 likewise changes from a circular cross section to an elliptical one so that it preferably butts against the entire surface of the inner core 102. If desired, the core 212 can maintain a circular cross section, and preferably the diameter thereof is made at least as large as the major axis of the elliptical core 102. The dielectric constant of the material 203 is chosen as in the arrangements of Figs. 11 and 12.

Fig. 14 shows a way of terminating the two-conductor member 50 of Fig. 4. The conductor cable 220 in Fig. 14 comprises two solid conductors 221 and 222 (of the same general size as the filamented conductors 51 and 52 of the cable 50) separated by a dielectric 223 of the same general shape as the dielectric strap member 53. The dielectric member 223 is chosen to be equal in dielectric constant to the member 53. It is obvious that the same principle illustrated in Fig. 14 can be applied to terminate a cable arrangement 60 like that shown in Fig. 5. In such an arrangement, the solid conductors 221 and 222 butt against the filamented conductors 61 and 62, no contact being made to the sheath 64 which in the arrangement of Fig. 5 is for shielding purposes only.

Fig. 15 shows a way of terminating a single filamented conductor of the type 70 shown in Fig. 6. In this situation, a round solid conductor 230 is butted against and connected to the filamented conductor 70 shown in Fig. 6. Obviously this way of terminating the cable 70 can be applied also to a termination for the filamented conductor 80 in Fig. 7.

The structures shown in Figs. 6, 8, 9 and 10 can be made by coating a multiplicity of very thin filaments with insulating material having low-loss factor and low dielectric constant, grouping a multiplicity of these insulating filaments into an approximately circular (or elliptical as in Fig. 10) bundle (around a circular or elliptical core, if one is used), and then dipping the entire bundle in a coating bath of the same insulating material so as to fill all the space between the metallic filaments with the insulating material. A sheath, if desired, can then be applied to the composite cable in any well-known manner. Similar methods can be used to construct the filamented conductors 51 and 52 in Fig. 4, 61 and 62 in Fig. 5, 30 in Fig. 2B, or 40 in Fig 3. In the arrangement of Fig. 5, while there is a sheath, this is applied only after the filamented members 61 and 62 have a relatively large amount of dielectric material 63 applied therearound. The manner in which the other cables or structures not specifically mentioned above are constructed is obvious in view of the descriptions of the manner of making the few chosen by way of example.

It is to be understood that the above-described arrangements are illustrative of the application of the principles of the invention. Numerous other embodiments may be devised by those skilled in the art without departing from the spirit and scope of the invention.

What is claimed is:

1. In an electromagnetic wave guiding system, a conducting medium comprising a multiplicity of elongated filamentary conducting portions spaced by means including insulating material, and means for launching high frequency electromagnetic waves in said system, there being a sufficient number of conducting portions to carry a substantial portion of the current induced by said waves, and each of said conducting portions having at least one dimension in a direction substantially transverse to the direction of wave propogation down the length thereof which is small compared with its appropriate skin depth at the highest frequency of operation with said high frequency waves, whereby the said conducting medium is substantially penetrated by the electric field of said waves, said conducting portions being maintained in substantially the same relative positions in the cross section of the medium throughout the length thereof.

2. The combination of elements as in claim 1 in which each of said conducting portions is a rectangular bar.

3. The combination of elements as in claim 1 in which said conducting portions are irregularly shaped and are spaced from one another.

4. The combination of elements as in claim 1 in which said conducting portions are in the form of filaments arranged in two groups spaced from one another by a distance which is greater than the distance between conducting portions in the individual groups.

5. The combination of elements as in claim 1 in which said conducting portions are in the form of filaments arranged in two groups spaced from one another by a distance which is greater than the distance between conducting portions in the individual groups, said groups of filaments being separated by dielectric material.

6. The combination of elements as in claim 1 in which said conducting portions are in the form of filaments arranged in two groups spaced from one another by a distance which is greater than the distance between conducting portions in the individual groups and said groups of filaments are separated by dielectric material, and a sheath surrounds said dielectric material.

7. The combination of elements as in claim 1 in which said filamentary conducting portions are arranged in a group which is encased in dielectric material.

8. The combination of elements as in claim 1 in which said filamentary conducting portions are arranged in a group which is formed as a coil and encased in dielectric material.

9. The combination of elements as in claim 1 in which said conducting medium fills the entire space between a coaxially arranged core and sheath.

10. The combination of elements as in claim 1 in which said conducting portions are arranged in two groups of parallel-positioned portions in the shape of a dipole and are encased in dielectric material.

11. The combination of elements as in claim 1 in which said filamentary conducting portions are encased in dielectric material within a sheath.

12. The combination of elements as in claim 1 in which said filamentary conducting portions are encased in dielectric material within a sheath and surrounding a central core.

13. The combination of elements as in claim 1 in which said filamentary conducting portions are encased in dielectric material within a non-circular sheath.

14. The combination of elements as in claim 1 in which said filamentary conducting portions are embedded in dielectric material and surrounded by a metal sheath, in further combination with a coaxial cable to which the conducting medium is joined comprising an outer conductor connected to said metal sheath, an inner conductor connected to at least one of the filaments, and dielectric material between said inner and outer conductors.

15. The combination of elements as in claim 1 in which said filamentary conducting portions are embedded in dielectric material and surrounded by a metal sheath, in further combination with a coaxial cable to which the conducting medium is joined comprising an outer conductor connected to said metal sheath, an inner conductor connected to at least one of the filaments, and dielectric material between said inner and outer conductors having a dielectric constant substantially equal to the average dielectric constant of the filaments and of the dielectric material surrounding them.

16. The combination of elements as in claim 1 in which said filamentary conducting portions are embedded in dielectric material around a central metal core and surrounded by a metal sheath, in further combination with a coaxial cable to which the conducting medium is joined comprising an outer conductor connected to said metal sheath, an inner conductor connected to the central metal core, and dielectric material between said inner and outer conductors.

17. The combination of elements as in claim 1 in which said filamentary conducting portions are embedded in dielectric material around a central metal core and surrounded by a metal sheath, in further combination with a coaxial cable to which the conducting medium is joined comprising an outer conductor connected to said metal sheath, an inner conductor connected to the central metal core, and dielectric material between said inner and outer conductors having a dielectric constant substantially equal to the average dielectric constant of the filaments and of the dielectric material surrounding them.

18. The combination of elements as in claim 1 in which said filamentary conducting portions are embedded in dielectric material around a central metal core and surrounded by an elliptical metal sheath, in further combination with a coaxial cable to which the conducting medium is joined comprising an outer conductor connected to said metal sheath, an inner conductor connected to the central metal core, and dielectric material between said inner and outer conductors.

19. The combination of elements as in claim 1 in which said conducting portions are in the form of two spaced bundles of insulated filaments separated by dielectric material, in further combination with a pair of solid conductors connected respectively to said bundles and separated by a dielectric strap having a dielectric constant equal to that of the spaced bundles.

20. The combination of elements as in claim 1 in which said conducting portions are in the form of a bundle of insulated filaments, in further combination with a solid conductor butted against the end of said bundle.

References Cited in the file of this patent

UNITED STATES PATENTS

| | | |
|---|---|---|
| 1,039,717 | Fessenden | Oct. 1, 1912 |
| 1,701,278 | Silbermann | Feb. 5, 1929 |
| 1,996,186 | Affel | Apr. 2, 1935 |